United States Patent [19]

McCabria

[11] Patent Number: 4,685,354

[45] Date of Patent: Aug. 11, 1987

[54] TRANSMISSION WITH A SPEED REDUCER AND GEAR SHIFTER

[75] Inventor: Jack L. McCabria, Lima, Ohio

[73] Assignee: Westinghouse Electric Corp., Pittsburgh, Pa.

[21] Appl. No.: 915,944

[22] Filed: Oct. 3, 1986

Related U.S. Application Data

[63] Continuation of Ser. No. 746,892, Jun. 20, 1985, abandoned.

[51] Int. Cl.$^4$ .......................... F16H 57/10; F16H 3/44
[52] U.S. Cl. .................................... 74/785; 74/665 A
[58] Field of Search ............ 74/785, 786, 787, 665 A, 74/665 B

[56] References Cited

U.S. PATENT DOCUMENTS

| | | | |
|---|---|---|---|
| 2,377,199 | 5/1945 | Adams et al. | 74/786 X |
| 2,427,168 | 9/1947 | Thompson et al. | 74/785 |
| 2,681,133 | 6/1954 | Kindseth et al. | 74/785 X |
| 2,885,907 | 5/1959 | Glamann | 74/665 B |
| 2,913,061 | 11/1959 | Beyerstedt et al. | 74/786 X |
| 2,959,983 | 11/1960 | Wise | 74/785 X |
| 2,974,753 | 3/1961 | Allin, Sr. et al. | 74/785 X |
| 2,996,932 | 8/1961 | Gsching | 74/785 X |
| 3,741,039 | 6/1973 | Garland | 74/786 |
| 3,831,464 | 8/1974 | Zaiser | 74/763 |
| 4,328,717 | 5/1982 | Arai | 74/760 |
| 4,360,092 | 11/1982 | Muller et al. | 74/787 X |
| 4,467,666 | 8/1984 | Ackermann | 74/665 B X |

FOREIGN PATENT DOCUMENTS

| | | | |
|---|---|---|---|
| 508846 | 9/1930 | Fed. Rep. of Germany | 74/785 |
| 1953146 | 4/1971 | Fed. Rep. of Germany | 74/665 A |
| 1278798 | 11/1961 | France | 74/785 |
| 511963 | 8/1939 | United Kingdom | 74/785 |

Primary Examiner—Leslie Braun
Assistant Examiner—Dwight G. Diehl
Attorney, Agent, or Firm—R. P. Lenart

[57] ABSTRACT

A transmission for an electrically powered vehicle includes an output shaft having a central axis and a carrier gear mounted to rotate about that axis. The carrier gear is driven by at least one electric motor and is coupled to the output shaft by an over-running clutch. A plurality of planetary gears are mounted on shafts which are attached to the carrier gear and positioned to engage a sun gear on the output shaft and a ring gear. A housing surrounds the gear assembly and a mechanism is provided to inhibit rotation of the ring gear thereby increasing the speed of the output shaft relative to the speed of the carrier gear.

1 Claim, 2 Drawing Figures

TRANSMISSION WITH A SPEED REDUCER AND GEAR SHIFTER

This application is a continuation of application Ser. No. 06/746,892, filed June 20, 1985 now abandoned.

BACKGROUND OF THE INVENTION

This invention relates to mechanical transmissions for electrically driven vehicles, and more particularly to such transmissions which include a speed reducer and gear shifter.

The power plant for an electric drive for a land vehicle consists of an engine driven alternator or generator, electrical power conversion equipment, motors and associated solid state controllers, and a mechanical transmission between the motors and a traction device. The traction device requires a high torque with input speeds from zero up to a few hundred revolutions per minute in each direction. In order to use smaller and lighter electric motors, it is desirable to have high speed motors capable of producing adequate power to accelerate the vehicle forward and backward, to turn the vehicle, and to drive the vehicle up an incline. Therefore, a transmission which produces a speed reduction is required. In addition to a speed reduction, a speed shifter within the transmission is desirable to produce maximum torque at low vehicle speeds.

SUMMARY OF THE INVENTION

The present invention transmission provides speed reduction and speed shifting between one or more electric motors and an output shaft. A transmission constructed in accordance with this invention includes an output shaft having a central axis and a carrier gear mounted to rotate about the central axis. The carrier gear is coupled to the output shaft by an over-running clutch. A plurality of planet gears are mounted on shafts which extend from circumferentially displaced positions on the carrier gear. A sun gear which is connected to the output shaft engages each of the planet gears. A ring gear is mounted to rotate about the central axis and is also engaged with each of the planet gears. A housing surrounds the gear configuration and speed shifting is provided by a means for inhibiting rotation of the ring gear with respect to the housing. One or more electric motors are mounted in a driving relationship with the carrier gear to provide the primary power.

DESCRIPTION OF THE PREFERRED EMBODIMENT

Figure 1:
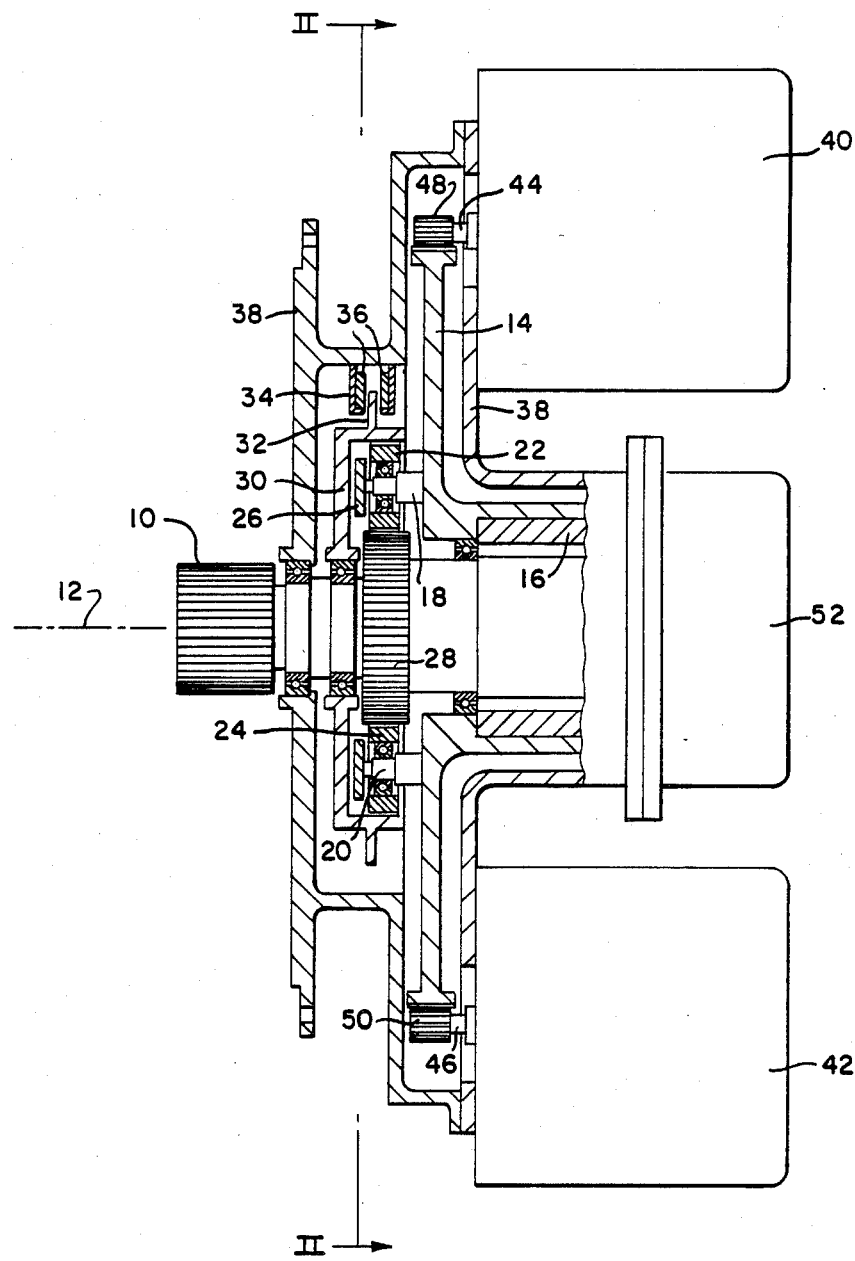
FIG. 1 is a side view, partially in cross section, of a transmission constructed in accordance with one embodiment of the present invention.

Referring to the drawings, FIG. 1 is a schematic side view, partially in cross section, of a transmission constructed in accordance with one embodiment of the present invention. This transmission includes an output shaft 10 having a central axis 12. A carrier gear 14 is mounted for rotation about the central axis and is coupled to the output shaft in a driving relationship by an over-running clutch 16. A plurality of planet gear shafts 18 and 20 extend from the carrier gear 14 at circumferentially displaced locations. Planet gears 22 and 24 are rotationally mounted on each of these planet gear shafts. A support ring 26 is attached to one end of each of the planet gear shafts. Sun gear 28 is connected to output shaft 10 and mounted to engage each of the planetary gears. A ring gear 30 is mounted for rotation about the central axis and also engages each of the planetary gears. A flange 32 extends radially outward from the ring gear. A brake assembly 34 which includes brake pads 36 is positioned over a portion of the radially extending flange 32 to inhibit rotation of the ring gear with respect to the transmission housing 38. This brake assembly is constructed in accordance with known technology. A second brake 52 is provided at one end of the output shaft. This second brake assembly is also constructed in accordance with known technology. It prevents movement of the vehicle when it is parked and can also serve as an emergency brake. Motors 40 and 42 having shafts 44 and 46, respectively, are mounted on housing 38. The motor shafts 44 and 46 include pinions 48 and 50, respectively, which engage teeth along the periphery of carrier gear 14 at diametrically opposed positions.

Figure 2:
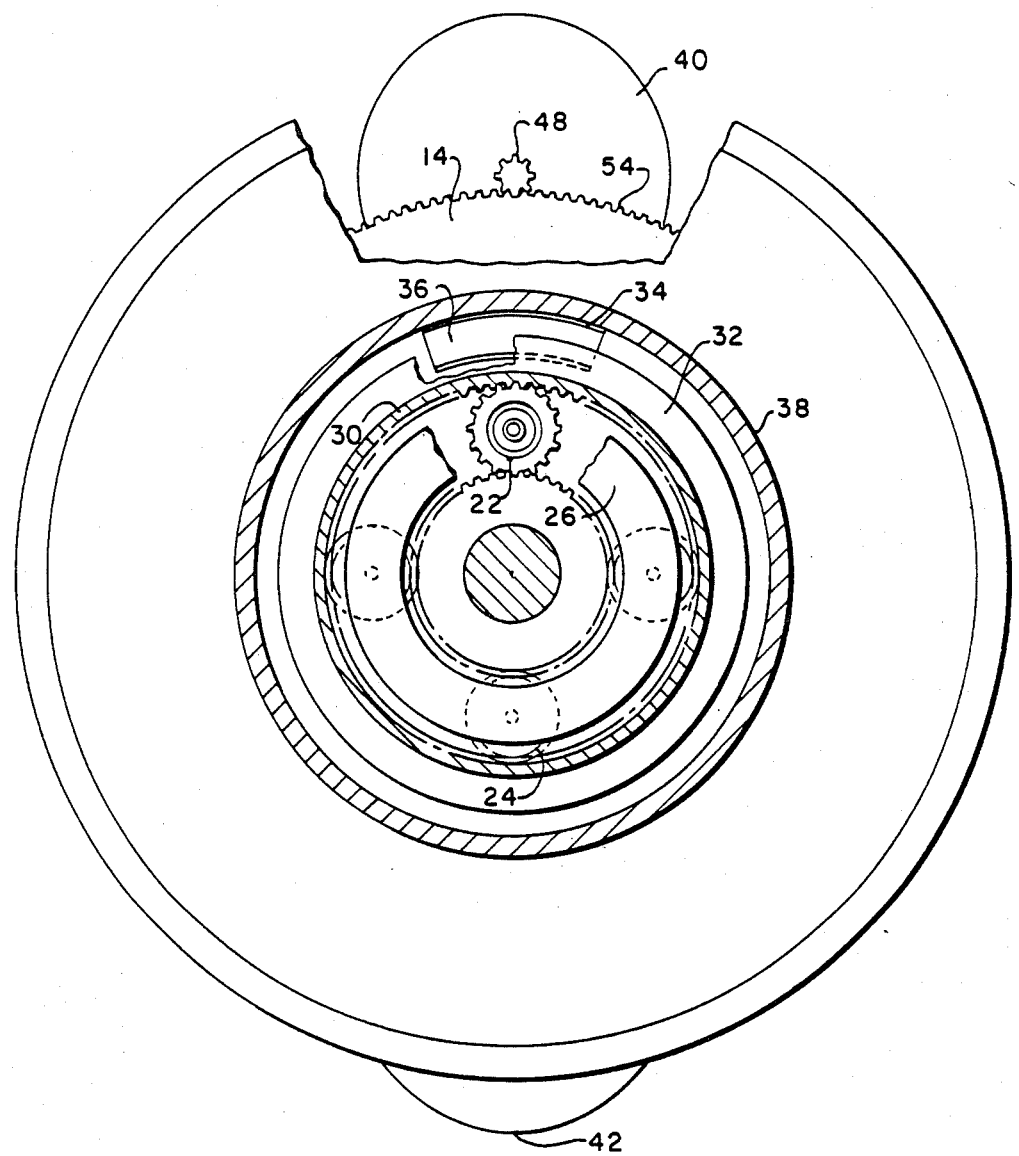
FIG. 2 is a cross section of the transmission of FIG. 1 taken along line II—II.

FIG. 2 is a cross section of the transmission of FIG. 1 taken along line II—II. A portion of the housing 38 in FIG. 2 has been cut away to illustrate the driving relationship between motor pinion 48 and teeth 54 on the periphery of carrier gear 14. Similarly, radially extending flange 32 has been cut away to illustrate brake pad 36. In this view, four planetary gears are illustrated. However, it should be understood that this invention is not limited to this particular number of planetary gears. Furthermore, although two motors are illustrated in FIGS. 1 and 2, this invention is equally applicable for use with a single motor or a larger number of motors.

The transmission of FIGS. 1 and 2 accommodates high speed motors and provides speed reduction with a speed shifter. The motor shaft pinions are sized to produce a high speed reduction between the motor shaft and the output shaft of the transmission. For initial acceleration of the vehicle, the brake 34 is disengaged so that ring gear 30 is free to rotate. For this mode of operation, torque is transferred from the carrier gear 14 through the over-running clutch 16 to the output shaft 10. This produces a direction of rotation of the output shaft which may be used to drive the vehicle in a first direction. When the transmission output shaft 10 is being driven by the carrier gear 14 through the over-running clutch 16, maximum speed reduction is achieved. On start-up, at zero speed, the locked rotor torque of the motors is multiplied by the gear ratio between the carrier gear and the motor pinions to produce the start-up torque for the vehicle traction device. As the speed of the vehicle increases, the electric motors reach maximum operating speed before the vehicle reaches maximum speed. At this point, a speed shift occurs within the transmission.

The speed shift is accomplished by using the brake 34 to apply a frictional force to the radially extending flange 32 on the ring gear 30. As the ring gear slows down, the planet gears which are carried by the carrier gear 14 apply torque to the sun gear, thereby rotating the output shaft. The sun and planetary gears are designed to increase speed of the sun gear relative to the carrier gear when the brake 34 is applied to reduce rotation of the ring gear. For a continuous mode of operation at maximum speed, sufficient brake torque would be applied to prevent rotation of the ring gear 30. The speed shifting planetary gear arrangement is designed such that the maximum allowable speed of the motors coincides with the maximum desired speed for the vehicle. For example, assume (1) the maximum allowable motor speed is 24,000 revolutions per minute, (2) the maximum desired speed of the vehicle is 60 miles per hour, and (3) the planetary gear shift is designed to increase the speed of the output shaft by a factor of three by application of brake 34. For this situation the transmission is designed to produce a vehicle speed of 60 miles per hour with the motors operating at 24,000 revolutions per minute with the power transferred through carrier gear 14, planet gear 22 and 24 and sun gear 28. Brake 34 is applied to prevent rotation of the ring gear 30 for this situation. The speed of the vehicle between 60 and 20 miles per hour is controlled by varying the speed of the motors. At 20 miles per hour the motor speed would be 8,000 revolutions per minute with brake 34 applied. In order to produce maximum torque at 20 miles per hour or less, brake 34 is released and the motor speed is increased to maintain the desired vehicle speed. The torque is transferred through over-running clutch 16 for this situation.

Reverse movement of the vehicle is provided by reverse rotation of the motors. Since clutch 16 is an over-running clutch, reverse rotation of the output shaft occurs only when brake 34 is applying a frictional force to flange 32. Dynamic braking can be provided by operating the motors as generators with the energy being consumed in an associated resistor bank.

The disclosed transmission is compatible with high speed, high power motors that are light and compact. These motors can be cooled by spraying oil onto the ends of the windings since the active length of the motors is small. A small active length is permitted by virtue of the high rotational speed of a plurality of motors. Speed shifting provides maximum output shaft torque at low speeds for a given horse-power rating of the drive motors at their maximum speed. Although the present invention has been described in terms of what is at present believed to be its preferred embodiment, it will be apparent to those skilled in the art that various changes may be made without departing from the invention. It is therefore intended that the appended claims cover all such changes.

What is claimed is:

1. A transmission for an electrically powered vehicle comprising:
    an output shaft having a central axis;
    a carrier gear having a plurality of peripheral teeth and being mounted to rotate about said central axis;
    an over-running clutch connected in a driving relationship between said output shaft and said carrier gear;
    a plurality of planet gear shafts extending from circumferentially displaced positions on said carrier gear;
    a plurality of planet gears wherein one of said planet gears is mounted to rotate about each of said planet gear shafts;
    a sun gear connected to said output shaft and engaged with each of said planet gears;
    a ring gear mounted to rotate about said central axis and engaged with each of said planet gears;
    a transmission housing;
    a flange extending radially outward from said ring gear;
    a brake for applying frictional forces to said flange, said brake being mounted in a fixed position with respect to said housing;
    a first electric motor attached to said housing and having a motor shaft including a first pinion positioned to engage said peripheral teeth of said carrier gear;
    a second electric motor attached to said housing and having a second motor shaft including a second pinion positioned to engage said peripheral teeth of said carrier gear;
    said first and second pinions engaging said peripheral teeth at diametrically opposed positions on said carrier gear; and
    said planet gears and said over-running clutch lying on opposite sides of said carrier gear.

* * * * *